(12) United States Patent
Sun et al.

(10) Patent No.: US 10,541,841 B1
(45) Date of Patent: Jan. 21, 2020

(54) HARDWARE TRANSMIT EQUALIZATION FOR HIGH SPEED

(71) Applicants: Advanced Micro Devices, Inc., Santa Clara, CA (US); ATI Technologies ULC, Markham (CA)

(72) Inventors: Shiqi Sun, Markham (CA); Michael J. Tresidder, Spicewood, TX (US); Yanfeng Wang, Richmond Hill (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 16/130,791

(22) Filed: Sep. 13, 2018

(51) Int. Cl.
*H03H 7/30* (2006.01)
*H04L 25/03* (2006.01)
*H04L 7/00* (2006.01)
*H04L 25/02* (2006.01)

(52) U.S. Cl.
CPC ...... *H04L 25/03878* (2013.01); *H04L 7/0008* (2013.01); *H04L 25/0272* (2013.01)

(58) Field of Classification Search
CPC ............. H04L 25/03878; H04L 7/0008; H04L 25/0272

USPC ................ 375/232, 230, 229, 219, 295, 316
See application file for complete search history.

(56) References Cited

U.S. PATENT DOCUMENTS

2010/0077097 A1* 3/2010 Brown .................... H04L 29/04
709/233
2010/0316065 A1* 12/2010 Kapil .................... G06F 13/385
370/465

\* cited by examiner

*Primary Examiner* — Zewdu A Kassa
(74) *Attorney, Agent, or Firm* — Meyertons Hood Kivlin Kowert and Goetzel PC; Rory D. Rankin (57) ABSTRACT

Systems, apparatuses, and methods for performing transmit equalization at a target high speed are disclosed. A computing system includes at least a transmitter, receiver, and a communication channel connecting the transmitter and the receiver. The communication channel includes a plurality of lanes which are subdivided into a first subset of lanes and a second subset of lanes. During equalization training, the first subset of lanes operate at a first speed while the second subset of lanes operate at a second speed. The first speed is the desired target speed for operating the communication link while the second speed is a relatively low speed capable of reliably carrying data over a given lane prior to equalization training. The first subset of lanes are trained at the first speed while feedback is conveyed from the receiver to the transmitter using the second subset of lanes operating at the second speed.

20 Claims, 8 Drawing Sheets

HARDWARE TRANSMIT EQUALIZATION FOR HIGH SPEED

BACKGROUND

Description of the Related Art

Modern processors include a variety of circuits and components to facilitate fast and efficient computation. In addition, circuits and components are included to manage communications between devices, including devices external to the processor. For example, processors frequently communicate with external devices such as display devices, external storage devices, network communications, as well as various other peripheral devices. In order to communicate with these devices, transactions are conveyed from, and received by, processing elements of the processor (e.g., central processing units, graphics processing units, etc.).

In modern computing systems, many system components are coupled together using point-to-point links. It is noted that a "point-to-point link" is also referred to as a "serial link" herein. A serial link is a communication channel which delivers data one bit at a time, and serial links are increasingly common because they have better signal integrity and can achieve a much higher data rate compared to parallel communication channels. However, preparing a point-to-point link for transferring data at high data rates is typically a slow and complicated process.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing transmit equalization at a target high speed are disclosed herein. A computing system includes at least a transmitter, receiver, and a communication channel connecting the transmitter and the receiver. The communication channel includes a plurality of N lanes, wherein N is positive integer greater than one. The plurality of lanes are subdivided into a first subset of lanes and a second subset of lanes. Any number of lanes is included in the first subset of lanes, from 1 to K, wherein K is a positive integer. Also, any number of lanes is included in the second subset of lanes, from 1 to (N–K). It is noted that the number of lanes in the first and second subsets varies according to the implementation.

During equalization training, the first subset of lanes operate at a first speed while the second subset of lanes operate at a second speed. The first speed is the desired target speed for operating the communication link while the second speed is a relatively low speed. The first subset of lanes are trained at the first speed while feedback is conveyed from the receiver to the transmitter using the second subset of lanes operating at the second speed. Since the second subset of lanes are operating at the lower, second speed, the second subset of lanes are able to carry the feedback information without first undergoing equalization training. After equalization training is completed for the first subset, the second subset is trained at the first speed with the first subset of lanes carrying feedback information from the receiver to the transmitter. After the second subset is trained, all of the lanes of the communication link are now able to carry data at the first speed. The above technique for performing equalization training reduces the number of steps and time involved in performing equalization training of a communication link.

Figure 1:
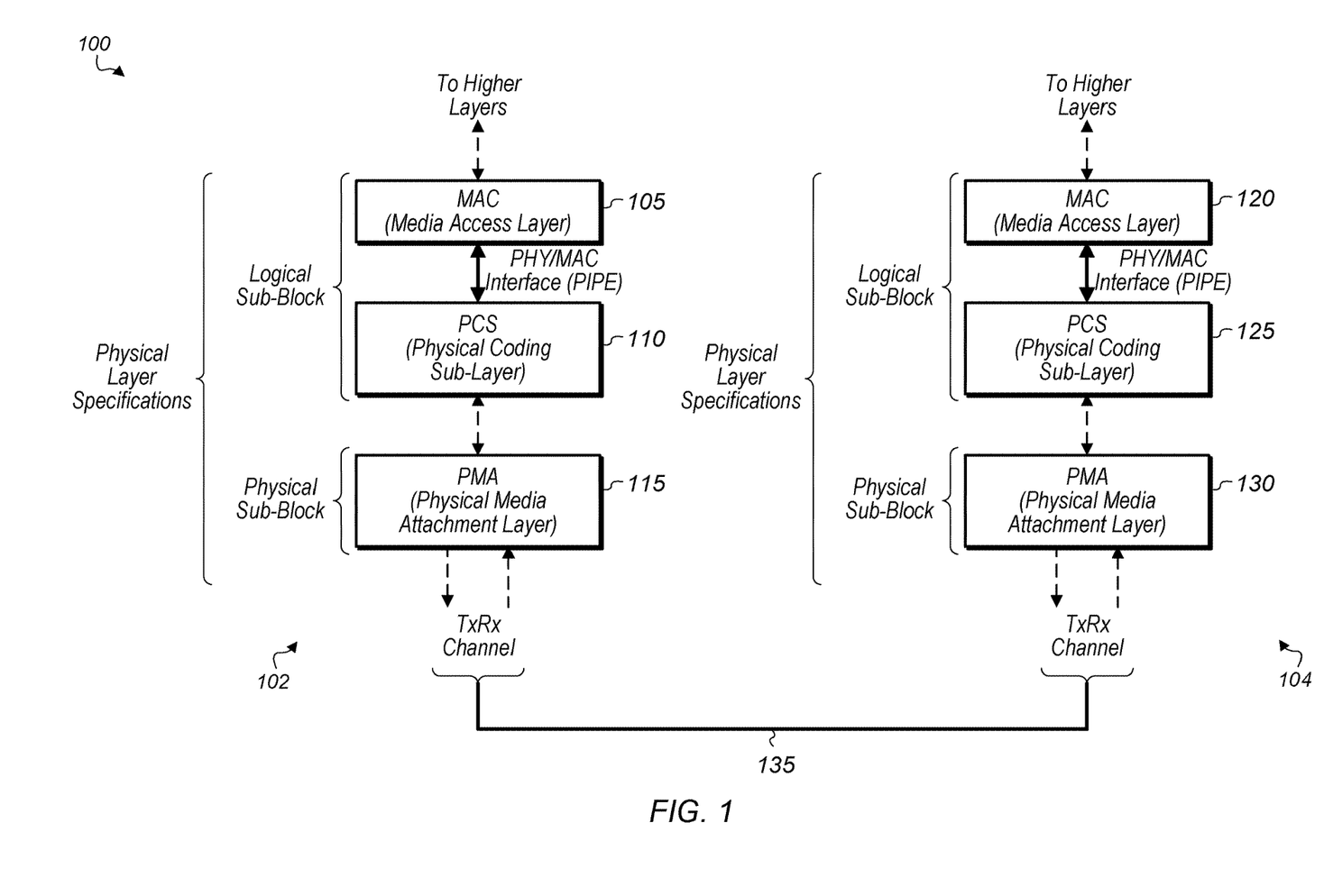
FIG. 1 is a block diagram of one implementation of the physical layer specifications for a communication channel.

Referring now to FIG. 1, a block diagram of one implementation of a transmitter 102 and a receiver 104 connected by a physical channel 135 is shown. In one implementation, transmitter 102 communicates with receiver 104 via physical channel 135, which has any number of data lanes. In one implementation, transmitter 102 includes a physical media attachment layer 115 to connect to the physical channel 135. Also, in one implementation, transmitter 102 includes logical sub-blocks physical coding sub-layer 110 and media access layer 105. Similarly, receiver 104 includes physical media attachment layer 130, physical coding sub-layer 125, and media access layer 120.

In one implementation, physical channel 135 is a point-to-point link between transmitter 102 and receiver 104 for sending serial data. It is noted that physical channel 135 can be a bi-directional link in some implementations. In these implementations, transmitter 102 and receiver 104 are referred to as transceivers. Physical channel 135 includes any number of data lanes, with the number of lanes varying according to the implementation. In one implementation, each data lane includes two uni-directional links between link partners.

In various implementations, transmitter 102 and receiver 104 are implemented as any of various types of devices in any of various types of computing systems. For example, in one implementation, transmitter 102 and receiver 104 are separate integrated circuits (ICs). In another implementation, transmitter 102 and receiver 104 are separate system on chips (SoCs). In a further implementation, transmitter 102 and receiver 104 are separate sockets. Other types of devices for implementing transmitter 102 and receiver 104 are possible and are contemplated.

In one implementation, transmit equalization is performed between two physical media attachment layers 115 and 130. The transmit equalization is controlled by the higher, logical levels 105 and 110 of transmitter 102 and logical levels 120 and 125 of receiver 104. In one embodiment, the logical levels provide the equalization settings to physical media attachment layers 115 and 130 and then check the feedback from physical media attachment layers 115 and 130. Based on the feedback, the logical levels apply the new equalization settings, check the feedback, and so on until the optimal transmit equalization settings are found.

System 100 includes various numbers of communication links for transferring data between transmitter-receiver pairs. One or more of these communication links have multiple data lanes. In one implementation, on power-up or reset, a given transceiver-receiver pair performs equalization training by subdividing the corresponding communication link into two subsets of data lanes. A first subset of data lanes operates at a high speed (i.e., the target speed) and undergoes transmit equalization training while a second subset of data lanes operates at a low speed and carries feedback information associated with the transmit equalization training of the first subset of data lanes. It is noted that "speed" is also referred to as "clock speed, "frequency", or "clock frequency" herein. Using this approach, the first subset of data lanes is able to be trained at the target speed in a single training phase. After the first subset of data lanes is trained, the second subset of data lanes is trained at the target speed while the first subset of data lanes carries corresponding feedback information. After the second subset of data lanes is trained, all data lanes of the communication link are able to carry data at the target speed. Any number of communication links is able to perform the above steps, with the number varying according to the system 100 and implementation.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
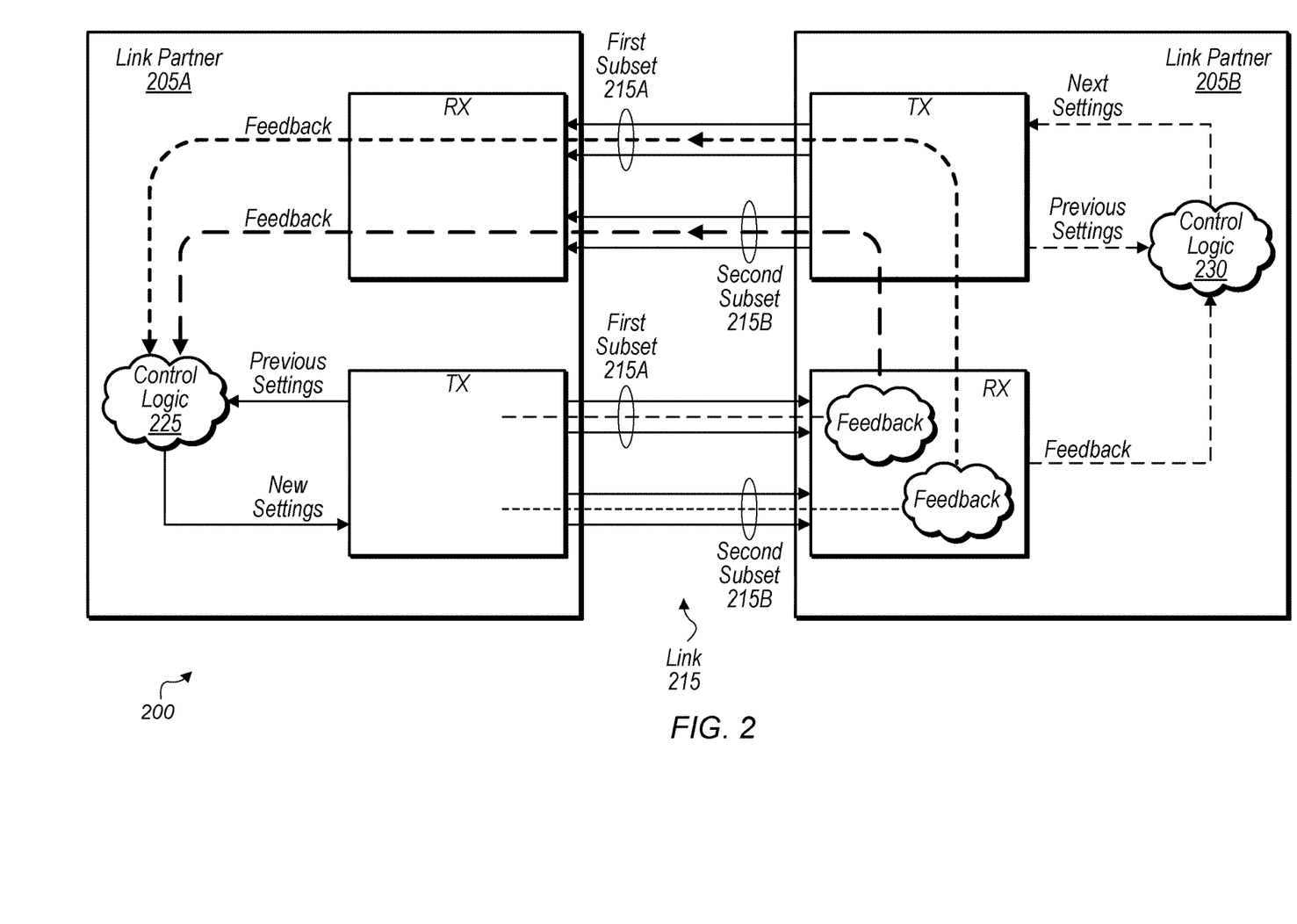
FIG. 2 is a block diagram of one implementation of a transmitter and a receiver of a computing system.

Turning now to FIG. 2, a block diagram illustrating one implementation of a link partner 205A and a link partner 205B of a computing system 200 is shown. Link partner 205A is coupled to link partner 205B via link 215. Link 215 includes any number of data lanes, depending on the implementation. Computing system 200 also includes one or more other components not shown to avoid obscuring the figure. For example, in various implementations, computing system 200 includes one or more processing units (e.g., processor, processor core, programmable logic device, application specific integrated circuit), one or more memory devices, and/or other components. The one or more processing units execute instructions and/or perform one or more types of computations (e.g., floating point, integer, memory, I/O) depending on the implementation. It is noted that link partner 205A and link partner 205B are also referred to as "transceivers" herein.

Link partner 205A includes control logic 225 for generating training sequences, analyzing feedback, adjusting transmit pre-emphasis settings, controlling speed settings, and/or performing other functions for the lanes of link 215. Although not shown in FIG. 2, in addition to control logic 225, link partner 205A can also include internal clock generation components and/or circuitry, phase-locked loops (PLLs), and/or other circuitry for adjusting clock rates. It is noted that control logic 225 is also referred to as a "control unit" herein. Link partner 205B includes control logic 230 for detecting equalization training sequences on link 215, comparing received test patterns to expected values, generating feedback, and/or performing other functions. Although not shown in FIG. 2, in addition to control logic 230, link partner 205B can also include internal clock generation components and/or circuitry, PLLs, and/or other circuitry for adjusting clock rates.

In one implementation, link partner 205A initiates an equalization training sequence at a first clock speed over a first subset of data lanes of link 215. The first clock speed is a high speed which is the target speed for high-speed operation of link 215. In other words, the first clock speed is the maximum clock speed at which data is able to be transferred on link 215. In one implementation, in order to initiate an equalization training sequence, link partner 205A transmits a training sequence indication on each lane of the first subset of data lanes being tested. In one implementation, the training sequence indication is a transition from a binary zero to a binary one followed by a predetermined number of ones. In other implementations, the training sequence indication is other types of transitions and/or values. After sending the training sequence indication, link partner 205A sends an equalization training pattern on each lane of the first subset of data lanes. In one implementation, the test pattern is a pseudo-random binary sequence (PRBS). Generally speaking, a PRBS is a deterministic binary sequence that exhibits behavior similar to that of a random binary sequence.

Link partner 205B receives the equalization training pattern sent on the first subset 215A of data lanes of link 215 and then link partner 205B checks whether there are any errors in the received test pattern by comparing the received data to expected values. Link partner 205B generates feedback data based on the number of errors in the captured training pattern. For example, in one implementation, the feedback data specifies a number of errors detected in the captured training pattern. Next, link partner 205B sends the feedback data to link partner 205A over a second subset 215B of data lanes of link 215 at a second clock speed. In one implementation, the second clock speed is a relatively low clock speed which allows data to be accurately received via the second subset 215B of data lanes prior to equalization training being performed on these lanes. In some cases, the second clock speed is substantially less than the first clock speed. For example, in one implementation, the second clock speed is less than half of the first clock speed. Link partner 205A captures the feedback data and then uses the feedback (along with the feedback from previous and/or subsequent tests) to identify the data eye for the first subset 215A of data lanes. After capturing the feedback, link partner 205A determines whether to perform another test or whether equalization training can terminate.

Once equalization training on the first subset 215A of data lanes of link 215 is completed, link partner 205A and link partner 205B perform equalization training on the second subset 215B of data lanes of link 215 in a similar fashion. However, one difference is that the feedback will be sent on the first subset 215A of data lanes at the first speed. Once the second subset 215B of data lanes have been trained, then all lanes of link 215 are able to operate at the first speed when carrying data transmitted by link partner 205A. It is noted that after link partner 205A is trained, link partner 205B can be trained in a similar manner.

System 200 is representative of any type of computing system or computing device which includes a link partner 205A and a link partner 205B. For example, in various implementations, system 200 is a computer, a server, a compute node, a processor, a processing device, a programmable logic device, a memory device, a processing in memory (PIM) node, a mobile device, a television, an entertainment system or device, and/or other types of systems or devices. System 200 also includes any number of other pairs of link partners in addition to link partner 205A and link partner 205B.

Figure 3:
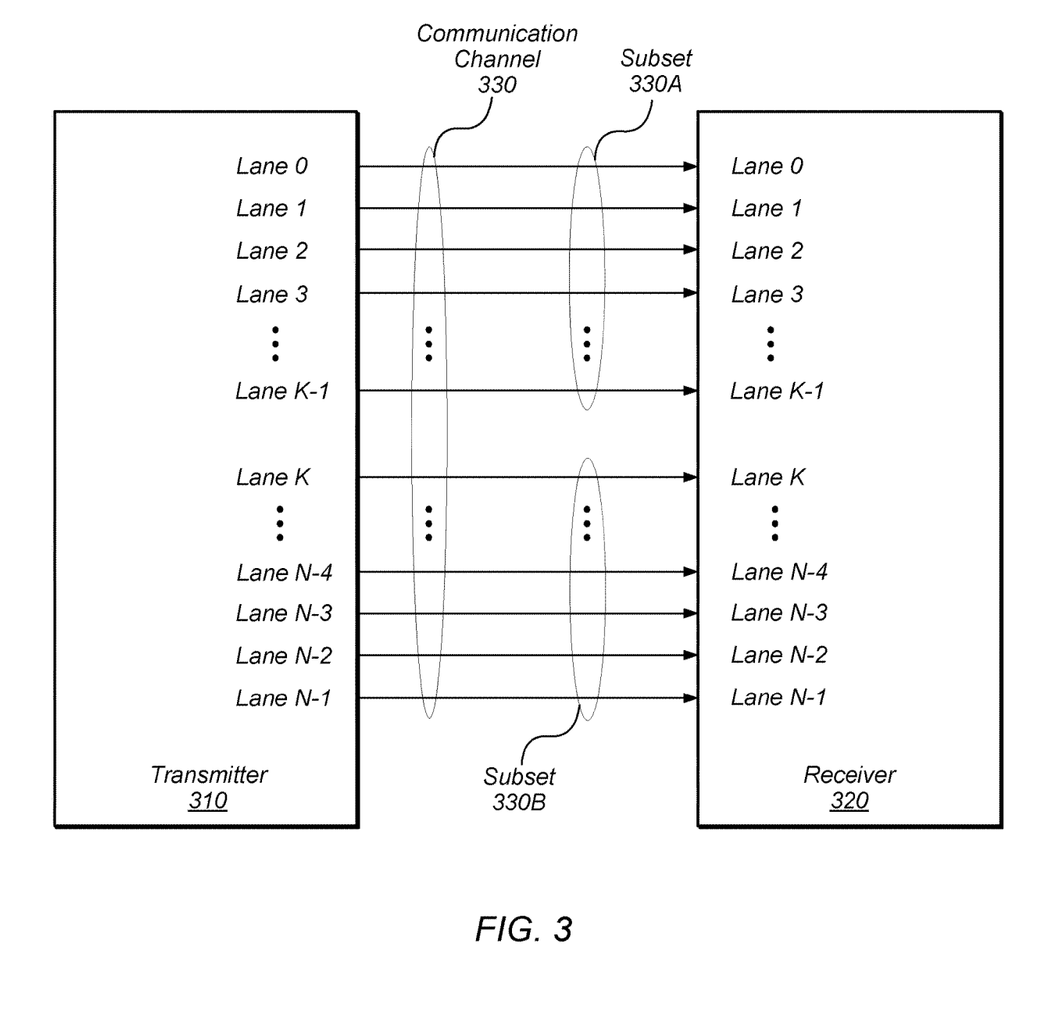
FIG. 3 is a block diagram of one implementation of a communication channel between a transmitter and a receiver.

Referring now to FIG. 3, a block diagram of one implementation of a communication channel 330 between a transmitter 310 and a receiver 320 is shown. Communication channel 330 is representative of any type of communication channel connecting a transmitter 310 and a receiver 320. It is noted that communication channel 330 is also referred to as a "communication link" herein. Communication channel 330 has any number "N" of data lanes, wherein N is a positive integer greater than one, and with the number "N" varying according to the implementation. Each data lane 0-(N−1) is configured to carry a serial bitstream. In other implementations, communication channel 330 includes a clock lane and/or one or more other lanes.

In one implementation, channel 330 is subdivided into subset 330A and subset 330B. As shown in FIG. 3, subset 330A includes K lanes while subset 330B includes (N−K) lanes. The value of K varies according to the implementation, with K being equal to any integer from 1 to (N−1). In one implementation, transmitter performs equalization training on subset 330A at a target clock speed while sending feedback associated with the equalization training at a relatively low speed on subset 330B. The target clock speed refers to the desired rate of sending data over communication channel 330 once all training has been completed and once communication channel 330 is considered operational. The relatively low speed is a clock speed which allows data to be sent and received in a reliable manner prior to any equalization training being performed. The term "reliable manner" refers to a received bit error rate being below a given threshold.

The feedback generated by receiver 320 and sent to transmitter 310 indicates if there were any errors in a received test pattern. In one implementation, the feedback is a single bit. In other implementations, the feedback utilizes multiple bits to indicate the number of errors. Transmitter 310 receives the feedback and utilizes the feedback to determine if its current transmission settings were inside or outside of the data eye. In one implementation, after transmitter 310 receives the feedback, transmitter 310 alters one or more transmission settings for the lanes of subset 330A and another test is performed if the training is deemed incomplete (e.g., there are errors indicated). Alternatively, the training is deemed complete (e.g., if there are no errors indicated) and transmitter 310 proceeds to the next step of training subset 330B at the target clock speed. When equalization training is performed for subset 330B at the target clock speed, receiver 320 sends feedback to transmitter 310 on subset 330A at the target clock speed. Transmitter 310 uses the feedback to adjust the transmission settings for the lanes of subset 330B. Once the training of the lanes of subset 330B is deemed complete, all lanes of subset 330A and 330B are able to begin normal operation and carry data at the target clock speed.

Figure 4:
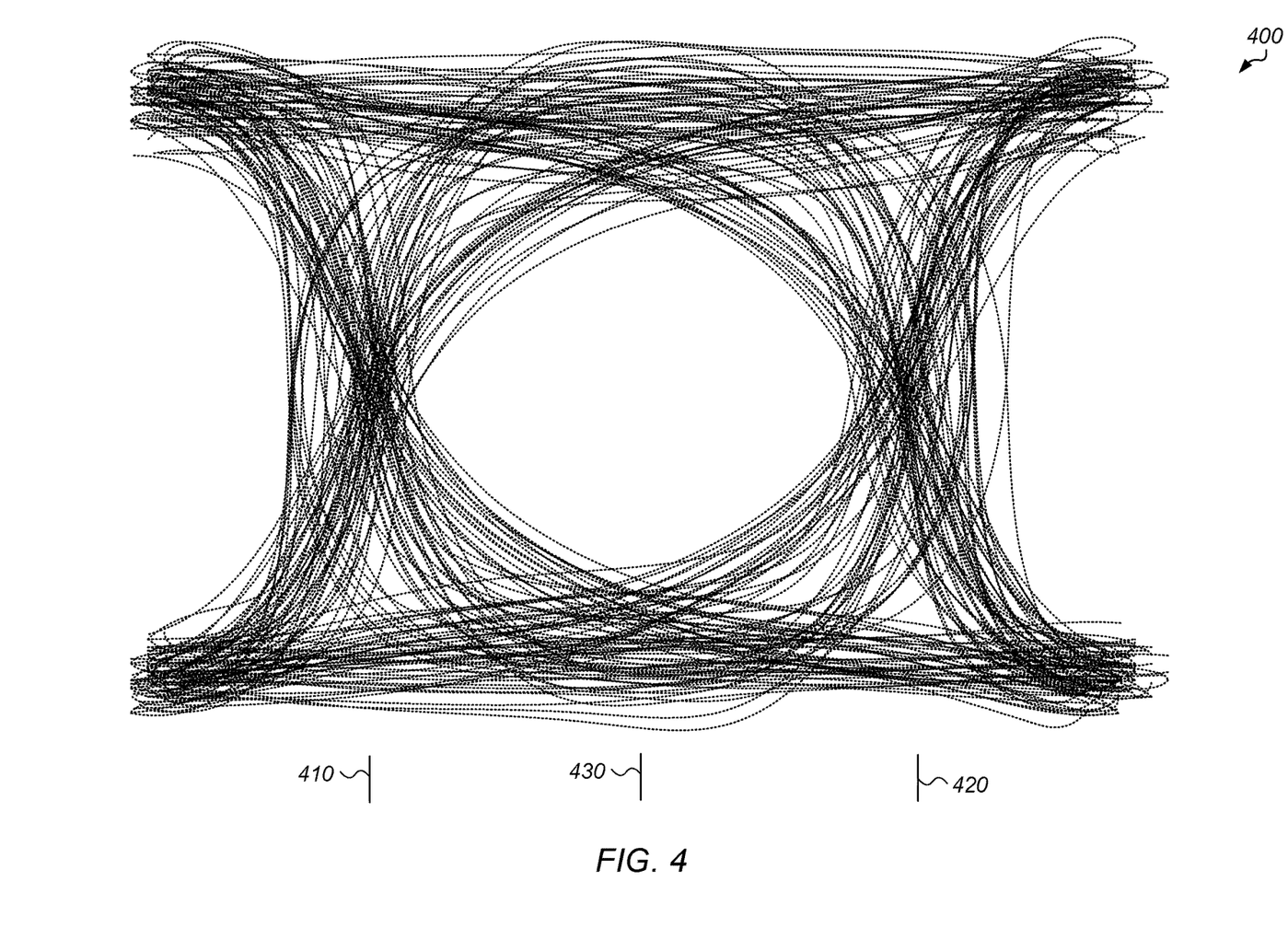
FIG. 4 is a diagram of one implementation of a data eye.

Turning now to FIG. 4, a diagram of one implementation of a data eye 400 is shown. Data eye 400 is one example of a data valid period which is monitored by capturing the bit transitions on a data lane of a channel (e.g., communication channel 330 of FIG. 3). In one implementation, a transmitter (e.g., transmitter 310 of FIG. 3) sends multiple feedback training sequences at different transmit settings to detect the boundaries of the data eye 400 for a first subset of lanes (e.g., subset 330A of FIG. 3) operating at a target speed. The transmitter receives feedback regarding the results of each test from the receiver (e.g., receiver 320 of FIG. 3) on a second subset of lanes (e.g., subset 330B of FIG. 3) operating at a relatively low speed. The receiver drives feedback on the second subset of lanes to indicate if any errors were detected for a given test.

In various implementations, the transmitter runs multiple tests at multiple transmit settings, and when the feedback goes from bad (i.e., one or more errors) to good (i.e., no errors), the transmitter recognizes that particular transmission setting as coinciding with the opening 410 of data eye 400. In one implementation, the transmitter adds delays in small increments and performs additional tests, and when the feedback goes from good to bad, the transmitter identifies this as the closing 420 of data eye 400. The transmitter takes the average of the opening 410 and the closing 420 to calculate the center 430 of data eye 400. The transmit settings corresponding to the center 430 of data eye 400 are considered the optimal transmit settings for the given data lane of the channel. The transmitter performs these tests for each data lane of the channel.

Figure 5:
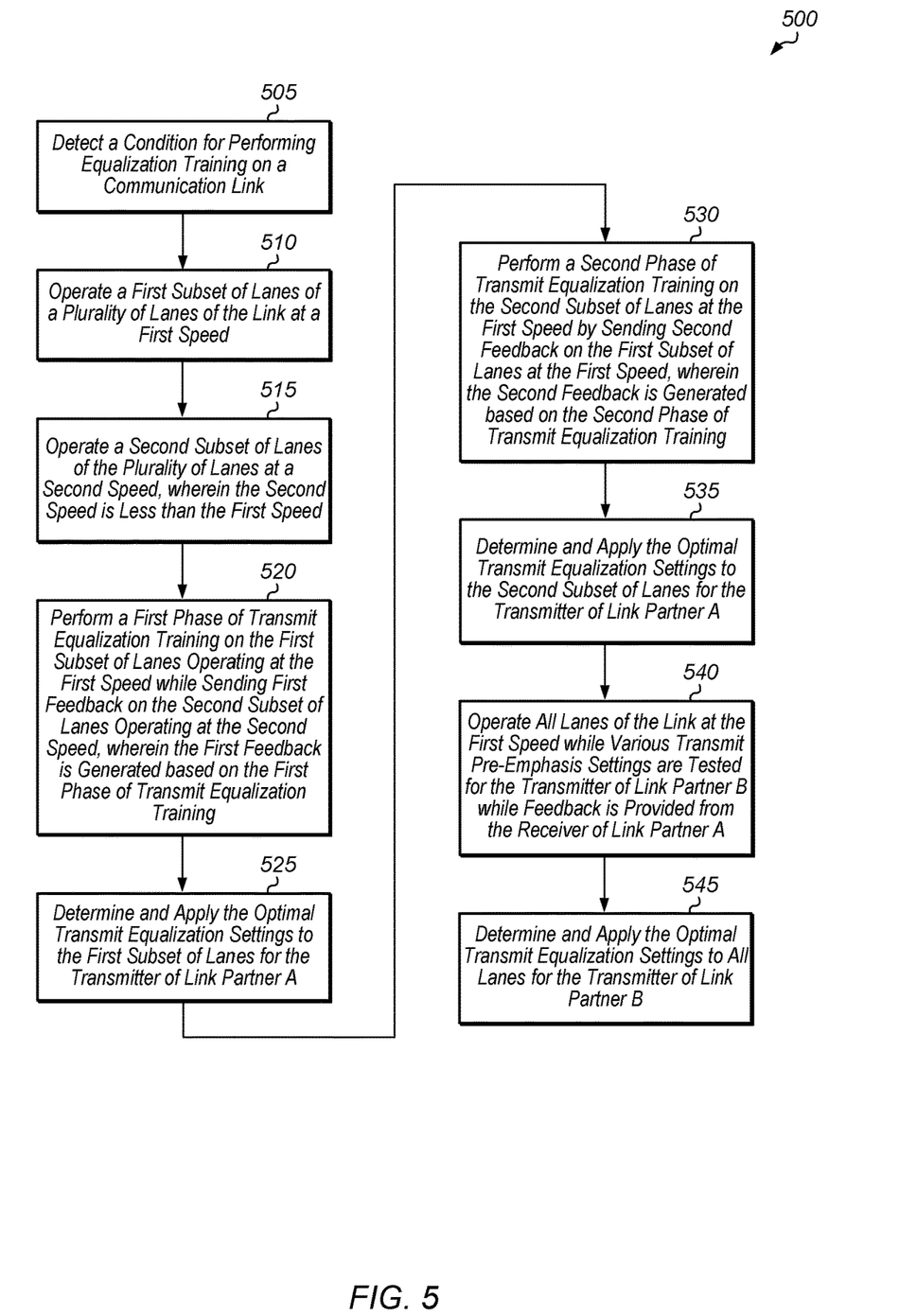
FIG. 5 is a generalized flow diagram illustrating one implementation of a method for performing equalization training.
Figure 6:
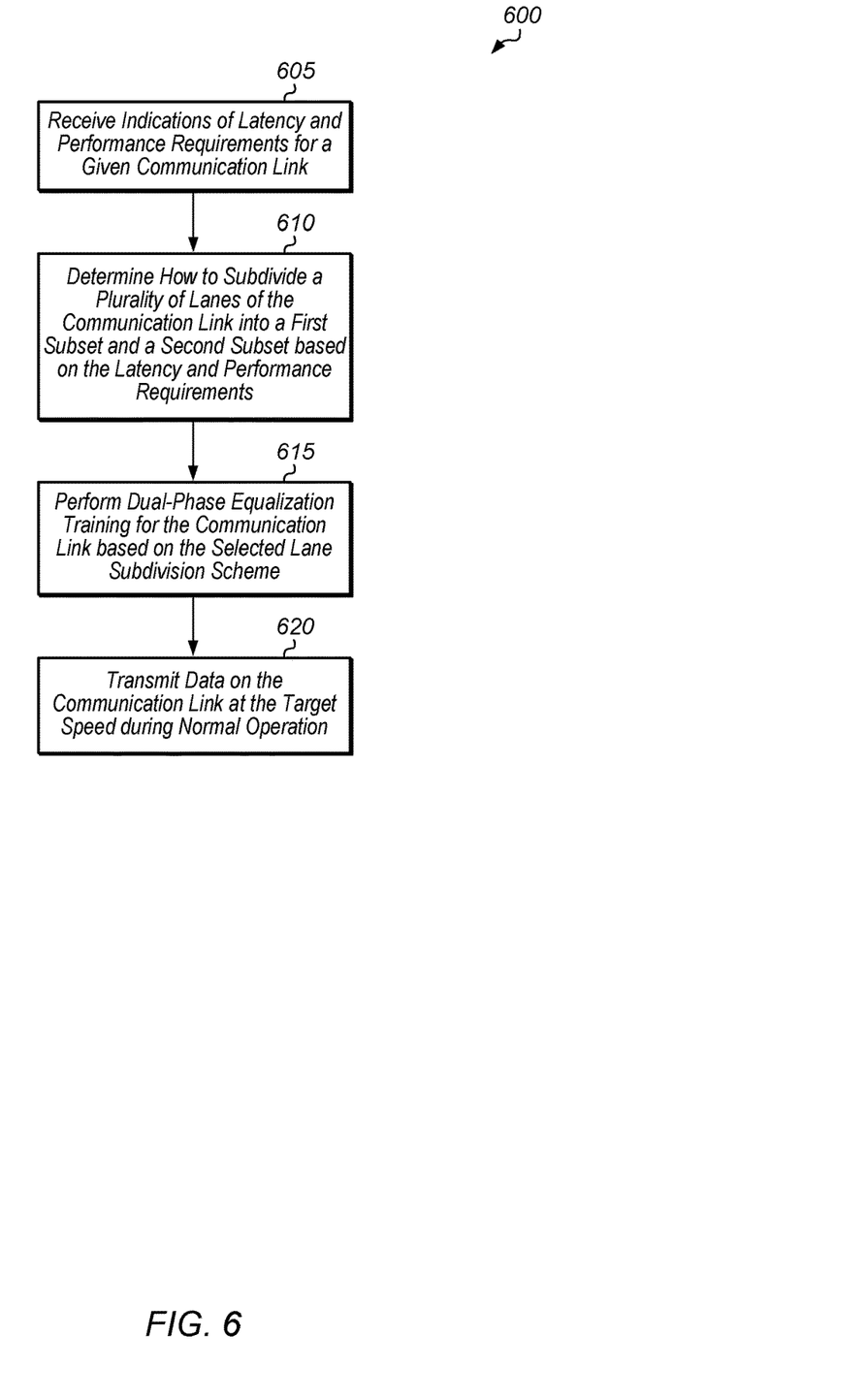
FIG. 6 is a generalized flow diagram illustrating one implementation of a method for determining how to subdivide a plurality of lanes of a communication link when performing equalization training.
Figure 7:
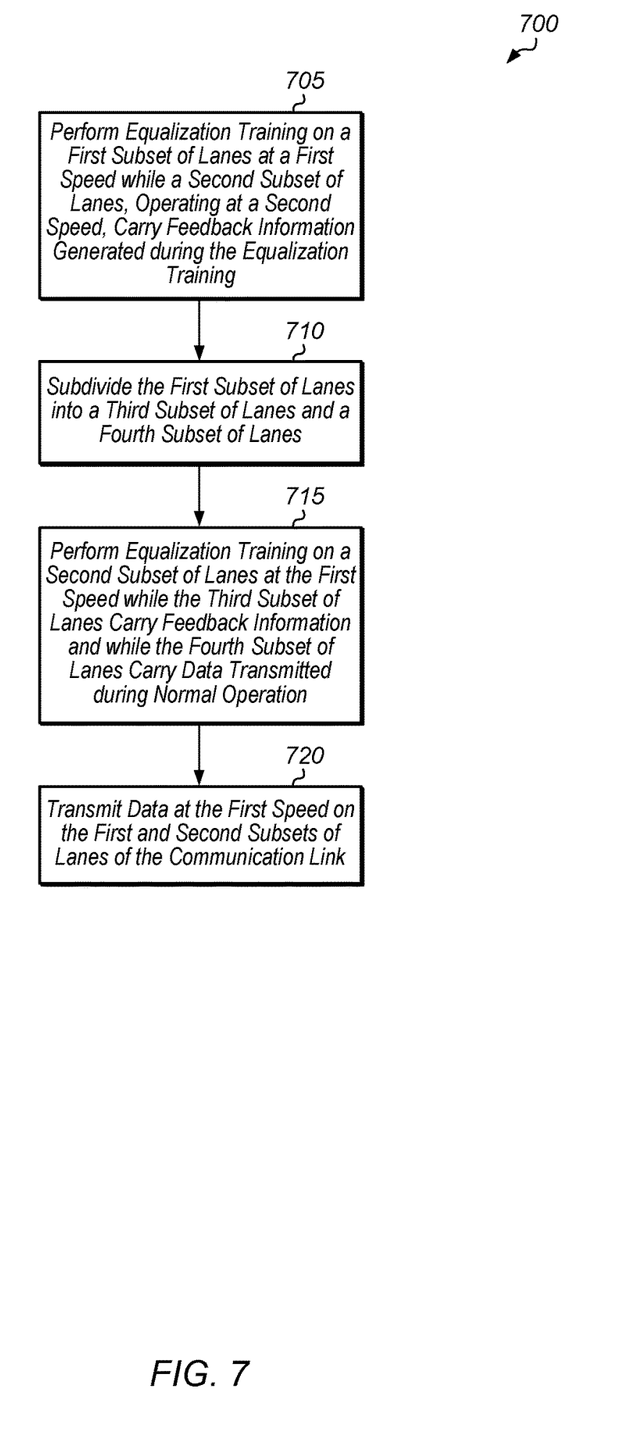
FIG. 7 is a generalized flow diagram illustrating one implementation of a method for performing reduced-latency equalization training.
Figure 8:
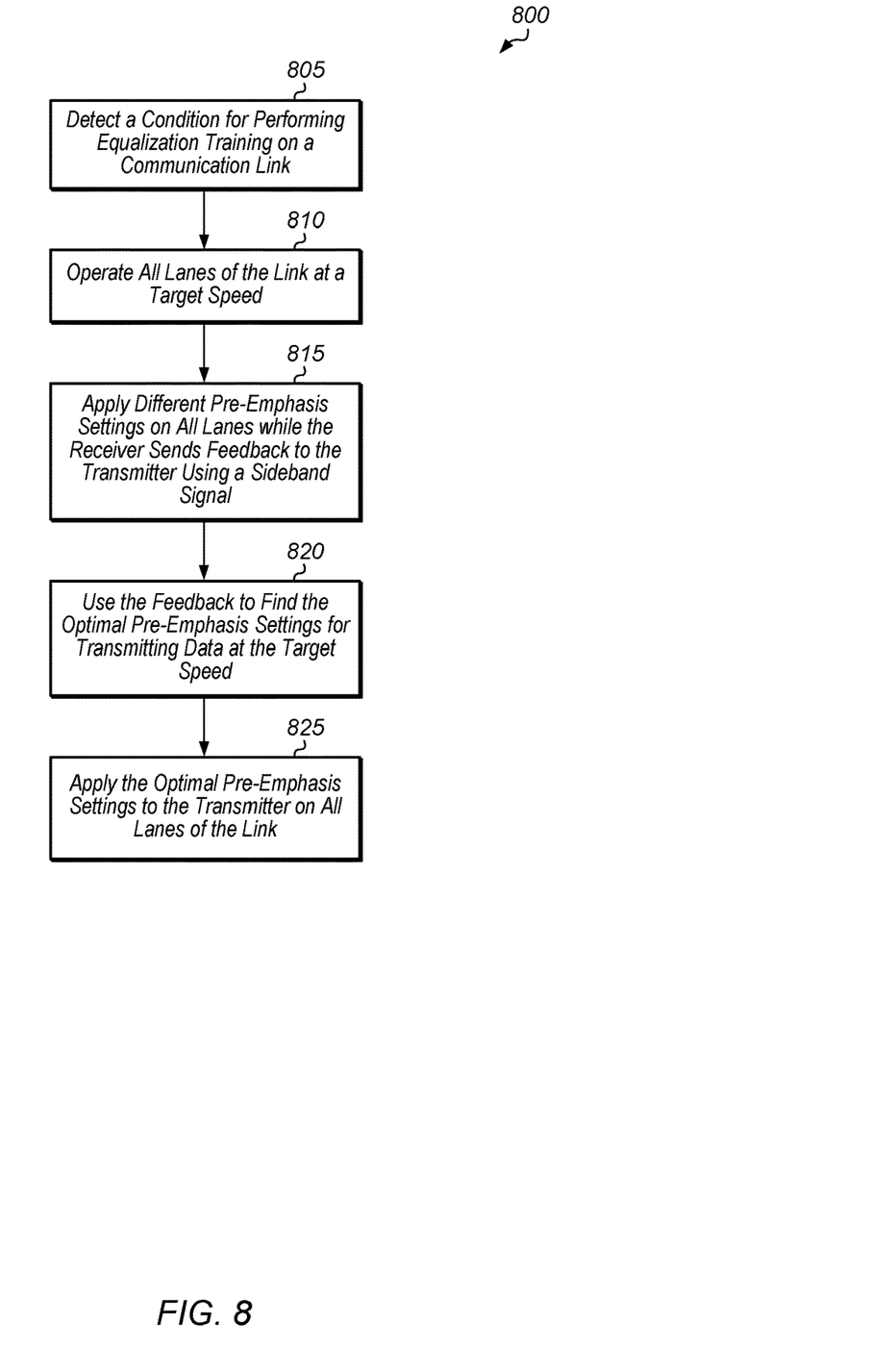
FIG. 8 is a generalized flow diagram illustrating one implementation of a method for performing equalization training using a sideband signal to convey feedback information.

Referring now to FIG. 5, one implementation of a method 500 for performing equalization training is shown. For purposes of discussion, the steps in this implementation and those of FIG. 6-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A control unit (e.g., control logic 225 of FIG. 2) coupled to a communication link detects a condition for performing equalization training on the communication link (block 505). In various implementations, the condition is a power-on cycle, a reset cycle, or otherwise. The communication link connects a first transceiver (e.g., link partner A) to a second transceiver (e.g., link partner B), and the communication link includes a plurality of lanes. It is noted that "equalization training" is also referred to herein as "transmit equalization training".

In response to detecting the condition, the control unit operates a first subset of lanes of the plurality of lanes at a first speed (block 510). It is noted that the first subset of lanes could include only a single lane in one implementation. In one implementation, the first speed is a target speed for operating the communication link. In other words, the first speed is the highest possible speed for reliably sending data over the communication link once equalization training has been completed. Also in response to detecting the condition, the control unit operates a second subset of lanes of the plurality of lanes at a second speed, wherein the second speed is less than the first speed (block 515). It is noted that the second subset of lanes could include only a single lane in one implementation. In other implementations, the second subset of lanes includes more than one lane. In one implementation, the second speed is a speed capable of reliably transmitting data over a given data lane prior to equalization training being performed on the given data lane. In other words, the second speed is low enough so that the link does not require having to undergo any transmit equalization to obtain a clear data eye. Accordingly, data can be transmitted at the second speed and be recovered without adjusting transmitter equalization settings. It is noted that the term "reliably transmitting data" is defined as transmitting and receiving data such that the expected transmission bit error rate is less than a threshold.

Next, a first phase of transmit equalization training is performed on the first subset of lanes operating at the first speed by applying different pre-emphasis settings on link partner A and sending first feedback, from link partner B to link partner A, on the second subset of lanes operating at the second speed (block 520). Next, after optimal transmit equalization settings are determined in block 520, the optimal transmit equalization settings are applied to the first subset of lanes for the transmitter of link partner A (block 525). After performing the first phase of transmit equalization training on the first subset of lanes, the first subset of lanes are able to reliably carry data from link partner A to link partner B at the first speed (i.e., the target speed).

Next, the control unit performs a second phase of transmit equalization training on the second subset of lanes of link partner A at the first speed by sending second feedback on the first subset of lanes at the first speed, wherein the second feedback is generated based on the second phase of transmit equalization training (block 530). Then, the optimal transmit equalization settings determined in block 530 are applied to the second subset of lanes for the transmitter of link partner A (block 535). After performing the second phase of transmit equalization training on the second subset of lanes, the first and second subset of lanes of the communication link are now able to reliably carry data at the first speed from the transmitter of link partner A to the receiver of link partner B.

Next, all lanes of the communication link are operated at the first speed while various transmit pre-emphasis settings are tested for the transmitter of link partner B while feedback is provided from the receiver of link partner A (block 540). Then, the optimal transmit equalization settings determined in block 540 are applied to all lanes for the transmitter of link partner B (block 545). After block 545, method 500 ends. It is noted that in other implementations, the steps of method 500 can vary. For example, in another implementation, the first subset of lanes are run at the first speed while the second subset of lanes are run at the second speed and transmit equalization training is performed for both link partner A and link partner B. Then, the second subset of lanes are trained for both link partners. Additionally, in a further implementation, there are more than two subset of lanes.

Turning now to FIG. 6, one implementation of a method 600 for determining how to subdivide a plurality of lanes of a communication link when performing equalization training is shown. A control unit receives indications of latency and performance requirements for a given communication link (block 605). Next, the control unit determines how to subdivide a plurality of lanes of the communication link into a first subset and a second subset based on the latency and performance requirements (block 610). For example, if the latency requirements have a higher priority than performance requirements, then the control unit prioritizes subdividing the plurality of lanes into a first subset with a relatively large number of lanes and a second subset with a relatively small number of lanes. Alternatively, if performance requirements are of a higher priority than latency requirements, then the control unit prioritizes subdividing the plurality of lanes into subsets of equal, or relatively close to equal, numbers of lanes. For example, if the total number of lanes for the communication link is 16, and performance requirements are of a higher priority than latency requirements, then in one implementation, the control unit subdivides the plurality of lanes into a first subset of 8 lanes and a second subset of 8 lanes. Next, the control unit performs dual-phase equalization training for the communication link based on the selected lane subdivision scheme (block 615). One example of a dual-phase equalization training is described in the discussion of method 500 of FIG. 5. After the dual-phase equalization training, the communication link transmits data at the target speed during normal operation (block 620). After block 620, method 600 ends.

Referring now to FIG. 7, one implementation of a method 700 for performing reduced-latency equalization training is shown. A control unit performs equalization training on a first subset of lanes at a first speed while a second subset of lanes, operating at a second speed, carry feedback information generated during the equalization training (block 705). In one implementation, the control unit is coupled to a communication link which includes the first and second subsets of lanes. In one implementation, the first speed is a target speed of the communication link while the second speed is a relatively low speed which allows data to be reliably sent on the link prior to equalization training.

Next, the control unit subdivides the first subset of lanes into a third subset of lanes and a fourth subset of lanes (block 710). The number of lanes in the third subset and the fourth subset varies according to the implementation. Then, the control unit performs equalization training on the second subset of lanes at the first speed while the third subset of lanes carry feedback information and while the fourth subset of lanes carry data transmitted during normal operation (block 715). In other words, the fourth subset of lanes carry data unrelated to the equalization training. It is noted that in one implementation, the third and fourth subset of lanes operate at the first speed in block 715. After the second subset of lanes are trained at the first speed, the first and second subsets of lanes of the communication link are used to transmit data at the first speed during normal operation (block 720). After block 720, method 700 ends.

Turning now to FIG. 8, one implementation of a method 800 for performing equalization training using a sideband signal to convey feedback information is shown. A control unit (e.g., control logic 225 of FIG. 2) coupled to a communication link detects a condition for performing equalization training on a communication link (block 805). Next, the control unit operates all lanes of the communication link at a target speed (block 810). Then, the control unit applies different pre-emphasis settings on all of the lanes while the receiver sends feedback to the transmitter using a sideband signal (block 815). It is noted that "pre-emphasis settings" refer to the transmit equalization settings applied to the transmitter. Next, the control unit uses the feedback to find the optimal pre-emphasis settings for transmitting data at the target speed (block 820). Then, the optimal pre-emphasis settings are applied to the transmitter on all of the lanes of the link (block 825). After block 825, method 800 ends. After performing the equalization training on the all of the lanes of the link, all of the lanes are able to reliably carry data at the target speed.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a control unit;
   a first transceiver;
   a second transceiver; and
   a communication link connecting the first transceiver and the second transceiver, wherein the communication link comprises a plurality of lanes;
   wherein responsive to detecting a condition for performing equalization training of the communication link, the control unit is configured to:
      subdivide the plurality of lanes into a first subset of lanes and a second subset of lanes;
      operate the first subset of lanes at a first speed;
      operate the second subset of lanes at a second speed while operating the first subset of lanes at the first speed, wherein the second speed is less than the first speed; and
      perform equalization training on the first subset of lanes at the first speed by sending feedback on the second subset of lanes at the second speed.

2. The system as recited in claim 1, wherein performing equalization training comprises adjusting transmit settings of the first transceiver on the first subset of lanes based on feedback received via the second subset of lanes.

3. The system as recited in claim 1, wherein the first speed is a target speed of operation of the plurality of lanes of the communication link.

4. The system as recited in claim 1, wherein the second speed allows data to be sent reliably over the communication link prior to performing equalization training.

5. The system as recited in claim 1, wherein subsequent to training the first subset of lanes, the control unit is configured to perform equalization training on the second subset of lanes at the first speed by sending feedback on the first subset of lanes at the first speed.

6. The system as recited in claim 5, wherein subsequent to performing equalization training on the second subset of lanes, the control unit is configured to initiate normal data operations on the plurality of lanes at the first speed.

7. The system as recited in claim 1, wherein during equalization training of the first subset of lanes, the first subset of lanes carries signals transmitted in a first direction and the second subset of lanes carries signals transmitted in a second direction, and wherein the second direction is opposite to the first direction.

8. A method comprising:
   subdividing a plurality of lanes of a communication link into a first subset of lanes and a second subset of lanes, wherein the communication link couples a first transceiver to a second transceiver;
   operating the first subset of lanes at a first speed;
   operating the second subset of lanes at a second speed while operating the first subset of lanes at the first speed, wherein the second speed is less than the first speed; and
   performing equalization training on the first subset of lanes at the first speed by sending feedback on the second subset of lanes at the second speed.

9. The method as recited in claim 8, wherein performing equalization training comprises adjusting transmit settings of the first transceiver on the first subset of lanes based on feedback received via the second subset of lanes.

10. The method as recited in claim 8, wherein the first speed is a target speed of operation of the plurality of lanes of the communication link.

11. The method as recited in claim 8, wherein the second speed allows data to be sent reliably over the communication link prior to performing equalization training.

12. The method as recited in claim 8, wherein subsequent to training the first subset of lanes, the method further comprising performing equalization training on the second subset of lanes at the first speed by sending feedback on the first subset of lanes at the first speed.

13. The method as recited in claim 12, wherein subsequent to performing equalization training on the second subset of lanes, the method further comprising initiating normal data operations on the plurality of lanes at the first speed.

14. The method as recited in claim 8, wherein during equalization training of the first subset of lanes, the first subset of lanes carries signals transmitted in a first direction and the second subset of lanes carries signals transmitted in a second direction, and wherein the second direction is opposite to the first direction.

15. An apparatus comprising:
   a control unit; and
   a communication link comprising a plurality of lanes;
   wherein responsive to detecting a condition for performing equalization training of the communication link, the control unit is configured to:
      subdivide the plurality of lanes into a first subset of lanes and a second subset of lanes;
      operate the first subset of lanes at a first speed;
      operate the second subset of lanes at a second speed while operating the first subset of lanes at the first speed, wherein the second speed is less than the first speed; and
      perform equalization training on the first subset of lanes at the first speed by sending feedback on the second subset of lanes at the second speed.

16. The apparatus as recited in claim 15, wherein performing equalization training comprises causing transmit settings to be adjusted for the first subset of lanes based on feedback received via the second subset of lanes.

17. The apparatus as recited in claim 15, wherein the first speed is a target speed of operation of the plurality of lanes of the communication link.

18. The apparatus as recited in claim 15, wherein the second speed allows data to be sent reliably over the communication link prior to performing equalization training.

19. The apparatus as recited in claim 15, wherein subsequent to training the first subset of lanes, the control unit is configured to perform equalization training on the second subset of lanes at the first speed by sending feedback on the first subset of lanes at the first speed.

20. The apparatus as recited in claim 19, wherein subsequent to performing equalization training on the second subset of lanes, the control unit is configured to initiate normal data operations on the plurality of lanes at the first speed.

\* \* \* \* \*